United States Patent [19]

Burke

[11] Patent Number: 4,938,932

[45] Date of Patent: Jul. 3, 1990

[54] MONOLITHIC HIGH ACTIVITY CATALYST BED FOR A CATALYTIC GAS GENERATOR

[75] Inventor: William K. Burke, Bellevue, Wash.

[73] Assignee: Olin Corporation, Stamford, Conn.

[21] Appl. No.: 200,805

[22] Filed: May 31, 1988

[51] Int. Cl.⁵ .................................................. B01J 8/02
[52] U.S. Cl. .................................. 422/218; 60/39.462; 60/723
[58] Field of Search ............... 422/181, 192, 218, 222, 422/180, 311; 55/278; 60/39.462, 723; 502/527

[56] References Cited

U.S. PATENT DOCUMENTS

| | | | |
|---|---|---|---|
| 3,091,520 | 5/1963 | Newburn | 422/218 |
| 3,535,879 | 10/1970 | Kuntz | 502/527 |
| 3,871,828 | 3/1975 | Ellion et al. | 60/39.462 |
| 3,899,815 | 8/1975 | Maddox | 228/160 |
| 4,021,373 | 5/1977 | Kane | 502/316 |
| 4,120,151 | 10/1978 | Quigley, Jr. | 60/39.462 |

FOREIGN PATENT DOCUMENTS 584009 9/1959 Canada .
26376 2/1977 Japan .

Primary Examiner—Barry S. Richman
Assistant Examiner—D. John Griffith, Jr.
Attorney, Agent, or Firm—John R. Wahl; Bruce E. Burdick

[57] ABSTRACT

A monolithic catalyst bed for use in a catalytic gas generator includes catalytically-active metal screens having central openings and being composed of fine particles of catalyst supported by wires arranged in grid-like fashion. The bed also includes an injector tube having an end portion disposed through the central openings of the metal screens for mounting the metal screens in closely spaced side-by-side, stack-like relation extending outwardly from and radially about the tube end portion. The injector tube end portion is closed at its outer end and defines a passage for receiving an axial inflow of liquid propellant. The bed also includes an injector body supporting the injector tube and disposed at one end of the stack of metal screens, and a base plate mounted about the injector tube end portion adjacent to the closed outer end thereof and disposed at an opposite end of the stack of metal screens so as to define an annular space therebetween and about the injector tube end portion. The stack of metal screens are confined in the space between the injector body and base plate. The injector tube end portion has openings defined therethrough adjacent the metal screens for routing outflow of liquid from the tube passage through the openings and radially outwardly between the metal screens where the liquid propellant is catalytically decomposed into a gas which exits from about the periphery of the stack of metal screens.

17 Claims, 1 Drawing Sheet

MONOLITHIC HIGH ACTIVITY CATALYST BED FOR A CATALYTIC GAS GENERATOR

CROSS REFERENCE TO RELATED APPLICATION

Reference is hereby made to the following copending U.S. patent application dealing with related subject matter and assigned to the assignee of the present invention: "Gas Generator And Generating Method Employing Dual Catalytic And Thermal Liquid Propellant Decomposition Paths" by W. K. Burke, assigned U.S. Ser. No. 104,303 and filed Oct. 1, 1987, now U.S. Pat. No. 4,856,271, granted Aug. 15, 1989.

BACKGROUND OF THE INVENTION

1. Field of the Invention

The present invention generally relates to gas generators employed in small rocket engines and, more particularly, is concerned with a monolithic high activity catalyst bed for use in a catalytic gas generator of a rocket engine.

2. Description of the Prior Art

Small rocket engines of the type utilized in space satellites are generally of monopropellant design employing a catalytic gas generator within a thrust chamber to convert a liquid propellant, such as hydrazine, into a high-temperature, propulsive power-producing gas. The gas generator has a catalyst bed in communication with the thrust chamber of the engine. The liquid propellant is injected into the catalyst bed where it reacts to produce the high-temperature gas. The gas exits from the catalyst bed and is expanded through a nozzle on the aft end of the chamber to produce thrust. U.S. Patents to Eggers et al (3,695,041) and Daly (4,352,782), assigned to the same assignee the present invention, disclose representative examples of this type of small rocket engine.

As recognized in the above-cited Daly patent, the primary life-limiting component of such monopropellant rocket engines is the catalyst used for decomposing the propellant into a high-temperature gas. A catalytic gas generator containing a bed of Shell 405 catalyst for reacting hydrazine propellant is limited to applications where the acceleration and shock environments are low. When stresses exceed approximately 250 psi, the Shell 405 catalyst begins to fail in compression and shatters into very small particles. After the catalyst has shattered, the gas generator may catastrophically fail or operate in a degraded manner.

Catalyst made with alternate $Al_2O_3$ carriers have been tested and found to be two to three times stronger in compression than Shell 405 while possessing equivalent catalytic activity. The increased strength improves the resistance to environmental stress but the catalyst will not survive extreme environments. A significant effort has been made to utilize metal substrates that are coated with irridium. All efforts to date have been unsuccessful. The activity of the coated metals is not sufficient to decompose hydrazine. A partially successful technique consisted of coating a metal foam with $Al_2O_3$ carrier, and then impregnating the $Al_2O_3$ with irridium. A catalyst bed composed of this material was sufficiently active that hydrazine decomposed at low flow rates. However, the bed failed when the flow was increased to a practical level.

Consequently, a need still exists for a catalyst bed construction capable of withstanding and surviving severe acceleration and shock environments.

SUMMARY OF THE INVENTION

The present invention provides a monolithic high activity catalyst bed designed to satisfy the aforementioned needs. The catalyst bed of the present invention is tolerant of and can withstand extreme environmental stress produced by high shock and acceleration conditions while still providing high catalytic activity. The key factors in achieving these desirable features is the use of small catalyst particles and the compartmentalizing of the particles by use of metal wire-type screens. The screens provide support for and isolation of the catalyst particles from the environmental stress.

Accordingly, the present invention is directed to a catalyst bed for use in a catalytic gas generator. The catalyst bed includes (a) a plurality of catalytically-active screens being composed of fine particles of catalyst supported by wires arranged in a grid-like fashion; and (b) means for mounting the screens in closely spaced side-by-side stack-like relation. The mounting means is adapted for routing an axial inflow of a liquid from an external source to a center of the stack of screens and therefrom radially outwardly between the screens where the liquid is catalytically decomposed into a gas which exits from about a periphery of the stack of screens. Each of the screens has a central opening, is composed of metallic wire being etched chemically and having mid sized catalyst particles attached therebetween.

More particularly, the mounting means includes an injector tube having an end portion disposed through the central openings of the catalytically-active screens so as to mount the screens in the stack-like relation extending outwardly from and radially about the tube end portion. The injector tube end portion is closed at its outer end. The injector tube defines a passage for receiving the axial inflow of the liquid and its end portion has a plurality of openings defined therethrough adjacent the screens for routing outflow of liquid from the tube passage through the openings and radially outwardly between the screens where the liquid is catalytically decomposed into the gas which exits from about the periphery of the stack of screens.

Further, the mounting means includes means defining an annular space in which the stack of screens is confined. The defining means includes an injector body supporting the injector tube and disposed at one end of the stack of catalytically-active screens. The defining means also includes a base plate attached to the outer end of the injector tube and disposed at an opposite end of the stack of screens which together with the injector body defines the annular space therebetween.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
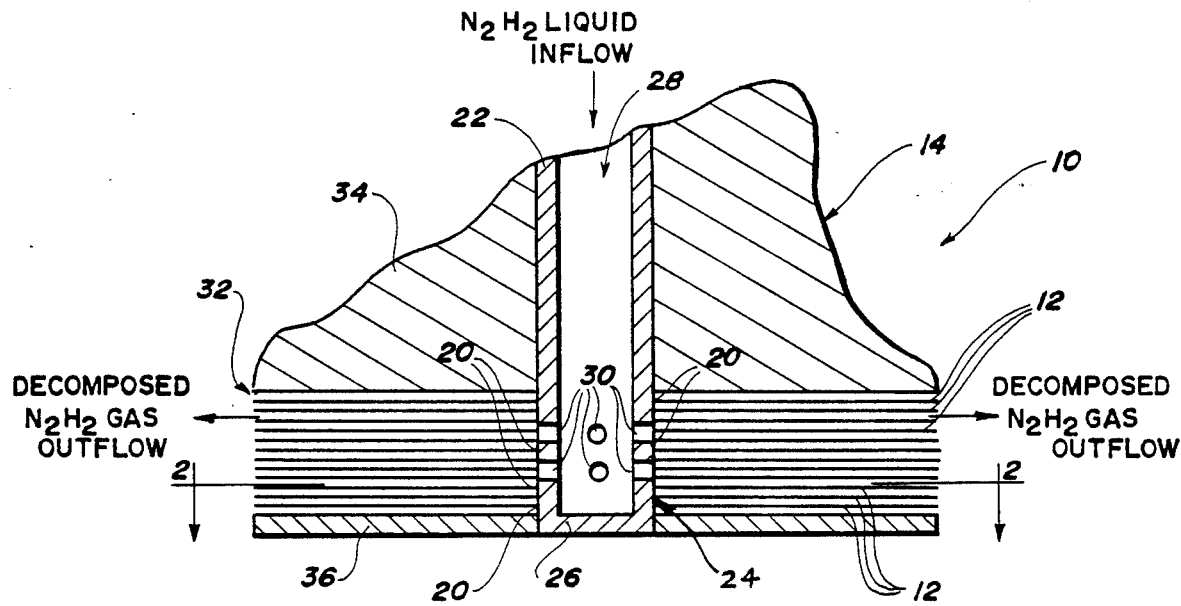
FIG. 1 is a fragmentary axial sectional view of a catalytic gas generator catalyst bed constructed in accordance with the principles of the present invention.
Figure 2:
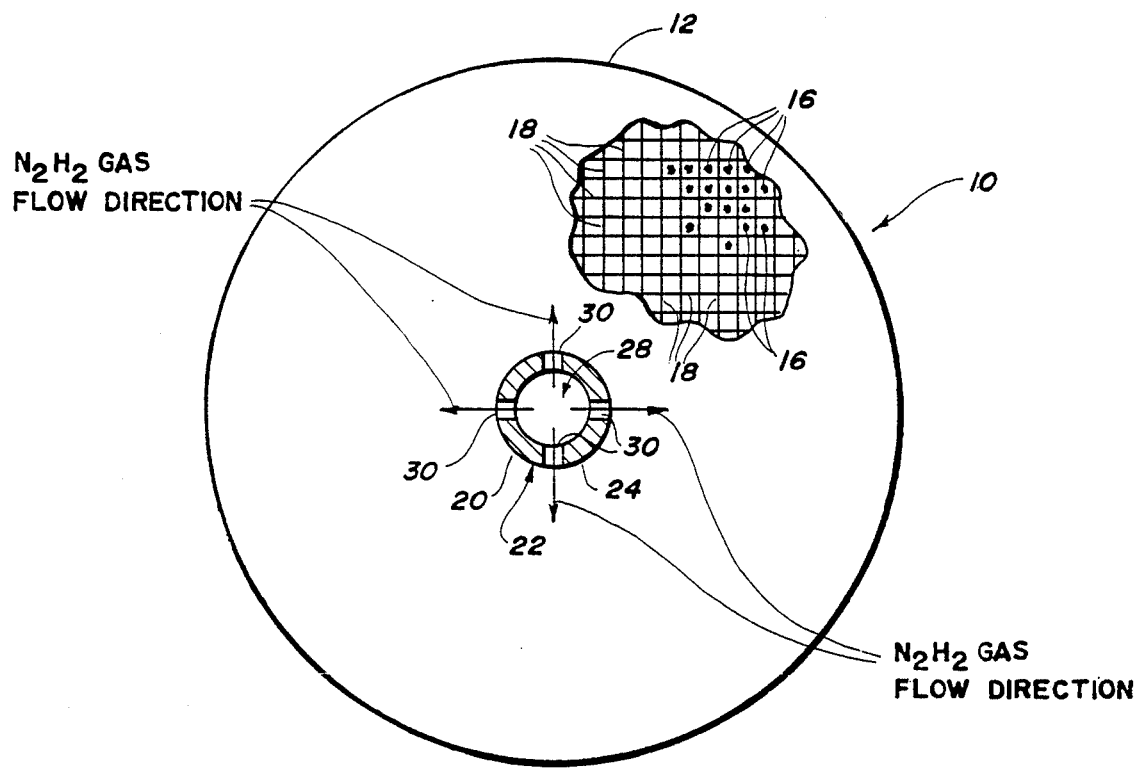
FIG. 2 is a plan view of one of the catalyst particle-bearing screens of the catalyst bed as taken along line 2—2 of FIG. 1.

Referring now to the drawings, and particularly to FIG. 1, there is shown a monolithic catalyst bed, generally indicated by the numeral 10 and comprising a preferred embodiment of the present invention. The catalyst bed 10 is particularly adapted for use in a catalytic gas generator (not shown) for a small rocket motor of the type disclosed in the U.S. patents cited previously.

In its basic components, the monolithic catalyst bed 10 includes a plurality of catalytically-active, or activated, screens 12, and means 14 for mounting the screens 12 in a closely spaced side-by-side stack-like relation. The screens 12 are composed of fine particles of catalyst 16 supported by wires 18 arranged in a grid-like fashion. Each of the screens 12 has a central opening 20. Also, the wires 18 composing each screen 12 are preferably fabricated from a suitable metal, such as stainless steel or high temperature alloys, and have been etched chemically so as to facilitate the attachment of mid sized catalyst particles therebetween. The mounting means 14 is adapted for routing an axial inflow of a desired liquid, such as a propellant hydrazine, from an external source to a center of the stack of screens 12 and therefrom radially outwardly between the screens 12 where the liquid propellant is catalytically decomposed into a gas propellant which exits from about a periphery of the stack of screens 12.

More particularly, the mounting means 14 includes an elongated cylindrical injector tube 22 having an end portion 24 disposed through the central openings 20 of the catalyticallyactive screens 12. In such manner, the injector tube 22 mounts the screens 12 in the stack-like relation extending outwardly from and radially about the tube end portion 24. The injector tube end portion 24 is closed at its outer end 26. The hollow interior of the injector tube 22 defines a passage 28 for receiving the axial inflow of the liquid propellant.

The end portion 24 of the injector tube 22 has a plurality of circumferentially and axially spaced apart openings 30 defined therethrough adjacent the locations of the screens 12 about the end portion 24. The inflow of liquid propellant through the injector tube passage 28 is routed from the tube passage 28 through the openings 30 to provide a liquid propellant outflow which progresses radially outwardly between the screens 12 where the liquid propellant is catalytically decomposed into the gas propellant which exits from about the periphery of the stack of screens.

Further, the mounting means 14 includes means defining an annular space 32 in which the stack of screens 12 is confined. The defining means includes an injector body 34 supporting the injector tube 22 and disposed at one side or end of the stack of catalytically-active screens 12. The defining means also includes a base plate 36 attached to the closed outer end 26 of the injector tube 22 and disposed at an opposite side or end of the stack of screens 12. The injector body 34 and base plate 36 together defines the annular space 32 therebetween and about the injector tube end portion 24.

Although other configurations are possible, the screens 12 are preferably circular shaped, and the injector body 34 and base plate are cylindrical shaped. Also, the openings 30 in the injector tube end portion 24 are circumferentially displaced about ninety degrees from one another so as to facilitate a relatively uniform outflow of liquid propellant to the screens 12.

The above-described monolithic catalyst bed 10 is tolerant of extreme environmental stress while still being capable of providing high catalytic activity. The catalyst bed 10 may be constructed in the following manner. The metal wire screens 12 are cut to size and then chemically etched. The etching increases the roughness of the screen wires and also removes chemical contaminants therefrom. Then, granular catalyst similar to Shell 405 is pulverized into mid sized granules or particles 16. The particles 16 are mixed with sodium silicate and spread onto the processed, i.e., etched, screens 12 so that granules 16 are captured between the wires 18. The screens 12 are air dried in an oven at 100 degrees C. Next the screens 12 are assembled into an arrangement similar to that shown in FIG. 1.

The procedure outlined above provides a catalyst bed 10 that can withstand high shock and acceleration environments and still possess high catalytic activity. The key factor in achieving these desirable features is the use of small catalyst particles 16. For example, if one compares a bed composed of 0.025 inch diameter granules with one containing 0.001 inch diameter granules, the surface area (which is a measure of catalyst activity) increases from 200 $in^2/in^3$ to 5000 $in^2/in^3$ The improved resistance of the catalyst bed 10 to shock and acceleration stresses is achieved by the compartmentalization of the catalyst. The screens 12, by having the fine particles 16 of catalyst captured or trapped by their grid-like arrangement of wires 18, provide support for and isolation of the catalyst from the environmental stress.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A catalyst bed for use in a catalytic gas generator, said catalyst bed comprising:
   (a) a plurality of catalytically-active screens being composed of wires arranged in a grid-like fashion, said wires trapping and supporting a plurality of particles of catalyst material therebetween; and
   (b) means for mounting said screens in closely spaced side-by-side stack-like relation, said mounting means being adapted for routing an axial inflow of a liquid from an external source to a center of said screens where the liquid is catalytically decomposed into a gas which exits from about a periphery of said stack of screens.

2. The catalyst bed as recited in claim 1, wherein each of said screens is composed of metallic wire being etched chemically and said catalyst particles have a diameter of about 0.001 inch.

3. The catalyst bed as recited in claim 1, said mounting means includes means defining an annular space in which said stack of screens is confined.

4. The catalyst bed as recited in claim 3, wherein said defining means includes an injector body disposed at one end of said stack of catalytically-active screens and a base plate disposed at an opposite end of said stack of screens so as to define said annular space therebetween.

5. The catalyst bed as recited in claim 1, wherein each of said screens has a central opening.

6. The catalyst bed as recited in claim 5, wherein said mounting means includes an injector tube having an end portion an outer end disposed through said central openings of said catalytically-active screens so as to mount said screens in said stack-like relation extending outwardly from and radially about said tube end portion.

7. The catalyst bed as recited in claim 6, wherein said injector tube end portion is closed at its outer end.

8. The catalyst bed as recited in claim 7, wherein said injector tube defines a passage for receiving the axial inflow of the liquid.

9. The catalyst bed as recited in claim 8, wherein said injector tube end portion has a plurality of openings defined therethrough adjacent said screens for routing outflow of liquid from said tube passage through said openings and radially outwardly between said screens where the liquid is catalytically decomposed into the gas which exits from about the periphery of said stack of screens.

10. The catalyst bed as recited in claim 6, said mounting means further includes means defining an annular space about said injector tube end portion in which said stack of screens is confined.

11. The catalyst bed as recited in claim 10, wherein said defining means includes an injector body supporting said injector tube and disposed at one end of said stack of catalyticallyactive screens.

12. The catalyst bed as recited in claim 11, wherein said defining means includes a base plate mounted about said injector tube end portion and disposed at an end of said stack of screens opposite from said injector body so as to define said annular space between said injector body and said base plate.

13. The catalyst bed as recited in claim 12, wherein said injector tube end portion is closed at its outer end.

14. The catalyst bed as recited in claim 13, wherein said injector tube defines a passage for receiving the axial inflow of the liquid.

15. The catalyst bed as recited in claim 14, wherein said injector tube end portion has a plurality of openings defined therethrough adjacent said screens for routing outflow of liquid from said tube passage through said openings and radially outwardly between said screens where the liquid is catalytically decomposed into the gas which exits from about the periphery of said stack of screens.

16. A catalyst bed for use in a catalytic gas generator, said catalyst bed comprising:
  (a) a plurality of catalytically-active metal screens, each having a central opening and being composed of wires arranged in a grid-like fashion, said wires trapping and supporting a plurality of particles of catalyst material therebetween;
  (b) an injector tube having an end portion terminating at a closed outer end, said end portion disposed through said central openings of said metal screens for mounting said metal screens in closely spaced side-by-side, stack-like relation extending outwardly from and radially about said tube end portion, said injector tube end portion defining a passage for receiving an axial inflow of a liquid;
  (c) an injector body supporting said injector tube and disposed at one end of said stack of catalytically-active metal screens; and
  (d) a base plate mounted about said injector tube end portion adjacent said closed outer end thereof and disposed at an end of said stack of metal screens opposite from said injector body so as to define an annular space therebetween and about said injector tube end portion, said stack of metal screens being confined in said space between said injector body and base plate;
  (e) said injector tube end portion having a plurality of openings defined therethrough adjacent said metal screens for routine outflow of liquid from said tube passage through said openings and radially outwardly between said metal screens where the liquid is catalytically decomposed into a gas which exits from about the periphery of said stack of metal screens.

17. The catalyst bed as recited in claim 16, wherein each of said screens is composed of metallic wire being etched chemically and said catalyst particles have a diameter of about 0.001 inch.

* * * * *